US012773956B2

(12) United States Patent
Fujimoto

(10) Patent No.: US 12,773,956 B2
(45) Date of Patent: Oct. 27, 2026

(54) CABLE ATTACHMENT STRUCTURE

(71) Applicant: TOYOTA JIDOSHA KABUSHIKI KAISHA, Toyota (JP)

(72) Inventor: Noriyoshi Fujimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 278 days.

(21) Appl. No.: 18/544,790

(22) Filed: Dec. 19, 2023

(65) Prior Publication Data

US 2024/0300423 A1 Sep. 12, 2024

(30) Foreign Application Priority Data

Mar. 10, 2023 (JP) ................................ 2023-038133

(51) Int. Cl.

| | |
|---|---|
| ***B60R 16/02*** | (2006.01) |
| ***H01R 13/512*** | (2006.01) |
| ***H01R 13/66*** | (2006.01) |
| ***H02G 3/04*** | (2006.01) |
| ***H02P 27/06*** | (2006.01) |

(52) U.S. Cl.
CPC ..... *B60R 16/0215* (2013.01); *H01R 13/6666* (2013.01); *H02G 3/0481* (2013.01); *H02P 27/06* (2013.01); *H01R 13/512* (2013.01); *H01R 2201/26* (2013.01)

(58) Field of Classification Search
CPC ............ B60R 16/0207; B60R 16/0215; H01R 2201/26; H02P 27/06
USPC ..................................... 361/56; 174/19, 73.1
See application file for complete search history.

(56) References Cited

U.S. PATENT DOCUMENTS

2011/0163705 A1* 7/2011 Sato ..................... H02K 11/026 318/400.24
2013/0026824 A1* 1/2013 Yoon ..................... B60L 3/0046 307/9.1
2020/0286649 A1* 9/2020 Kitahara .............. H02G 3/0616

FOREIGN PATENT DOCUMENTS

JP H03-001413 U 1/1991
JP 2016-046927 A 4/2016

* cited by examiner

*Primary Examiner* — Allen L Parker
*Assistant Examiner* — Dakota M Talbert
(74) *Attorney, Agent, or Firm* — SoraIP, Inc.

(57) ABSTRACT

In the wire harness, a connector attached to an electric wire is attached to a socket in a casing main body from a connection port, and the wire harness is connected to an inverter device. In the voltage suppressing section, the bracket is placed across the casing main body connection port and fastened and fixed to the stud bolt, thereby coming into surface contact with the housing of the connector. In the bracket, a flag terminal of a ground wire connected to the body is fastened and fixed to one of the stud bolts. As a result, the area around the connector and the connection port is grounded through the bracket, thereby suppressing common mode voltage, and suppressing radiation noise without using a ferrite core.

6 Claims, 5 Drawing Sheets

CABLE ATTACHMENT STRUCTURE

CROSS-REFERENCE TO RELATED APPLICATION

This application claims priority to Japanese Patent Application No. 2023-038133 filed on Mar. 10, 2023, incorporated herein by reference in its entirety.

BACKGROUND

1. Technical Field

The present disclosure relates to a cable attachment structure for a vehicle.

2. Description of Related Art

The clamp disclosed in Japanese Unexamined Utility Model Application Publication No. 3-1413 (JP 3-1413 U) is a cylinder that can be vertically divided, and a ferrite core is held and stored in a storage section at a center portion of the cylinder. Further, the clamp has a vinyl wire or cable outlet and a slit for clamping the vinyl wire or cable in each of the tapered portions at both ends of the cylinder.

SUMMARY

A vehicle that can be driven by an electric motor is equipped with a storage battery (battery), and the electric motor is provided with an inverter device. The inverter device is connected to the battery by a cable and converts high voltage (high voltage in the vehicle) direct current (DC) power supplied from the battery into alternating current (AC) power.

On the other hand, electromagnetic compatibility (EMC) is also required for the vehicle, and suppression of not only electromagnetic susceptibility (EMS) but also electromagnetic interference (EMI) is required. In the vehicle, radiated noise (electromagnetic noise, electromagnetic energy) that causes EMI is radiated when a common mode current is generated in the cable connecting the battery and the electric motor (inverter device).

To suppress radiated noise caused by such common mode current, it is common to use a ferrite core in the cable. However, since the ferrite core is more expensive than other parts and affects the ease of assembling the cable to the vehicle, there is room for improvement in suppressing radiated noise (EMI) in the vehicle.

The present disclosure has been made in view of the above fact, and an object of the present disclosure is to provide a cable attachment structure that can suppress costs due to suppression of radiated noise.

In order to achieve the above object, a cable attachment structure includes:

- a cable that includes a shield on an outer peripheral portion, the shield shielding a wire inside of the cable; and
- a metal casing that houses a powered device that generates a common mode current in the cable, the powered device being connected to a storage battery by the cable and supplied with power by the electric wire. A voltage suppressing portion that suppresses a common mode voltage that causes the common mode current is provided between the cable that is passed through a connection port of the casing and the casing.

In the above-mentioned cable attachment structure, the storage battery and the powered device are connected by the cable. The cable includes the shield on the outer peripheral portion so that the shield shields the wire inside of the cable. The powered device is operated by power supplied through the wire, thereby generating the common mode current in the cable.

Here, the voltage suppressing portion is provided between the cable that is passed through the connection port of the casing and the casing, and suppresses the common mode voltage that causes the common mode current in the powered device. Accordingly, it is possible to suppress the common mode current that causes conduction noise, and to suppress radiated noise.

In the above-mentioned cable attachment structure, the powered device is an inverter device that supplies power to an electric motor used as a driving source for traveling of a vehicle.

According to the present disclosure, since the common mode voltage is suppressed, it is possible to suppress radiated noise without using a ferrite core. Accordingly, the present disclosure has the effect of effectively suppressing increases in component costs and assembly costs due to suppression of radiated noise.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described with reference to drawings.

This embodiment includes the following aspects.

The cable attachment structure according to the first aspect is

- a cable including in an outer peripheral portion of the cable a shield for shielding an electrical wire inside the cable;
- a metal casing housing a power-fed device that is connected to a storage battery by the cable and that is supplied with power by the electric wire and that generates a common mode current in the cable;

including;

A voltage suppressor for suppressing a common mode voltage that causes the common mode current is provided between the cable passed through the connection port of the casing and the casing.

The second aspect of the cable attachment structure includes, in the first aspect, the powered device is an inverter device configured to supply power to an electric motor used as a driving source for causing a vehicle to travel.

In the second aspect, the cable attachment structure according to the third aspect includes:

The casing has a mounting bolt erected across the connection port of the cable,

The cable has a connector on the inverter device side that connects the electric wire to the inverter device by being attached to the connection port, The voltage suppressing section is a band-shaped bracket that is placed over the connection port and is electrically connected to the outer peripheral surface of the connector by being bridged over the mounting bolt and fastened and fixed;

a ground wire having a terminal disposed at one end fastened and fixed to one of the mounting bolts together with the bracket, and the other end connected to the vehicle body; including.

In the second or third aspect, the cable attachment structure according to the fourth aspect includes:

The casing has a mounting bolt erected at a peripheral edge of the cable connection port, In the voltage suppressing portion, a connection terminal to which the shield of the cable is connected is fastened and fixed to the mounting bolt.

In the third or fourth aspect, the cable attachment structure according to the fifth aspect includes:

The casing includes a casing main body with one side open, and a lid body that closes the opening surface of the casing main body, The mounting bolt is used for fastening and fixing the lid to the housing body.

The cable attachment structure according to the sixth aspect includes, in any one of the second to fifth aspects, The voltage suppressor is used to connect the cable to the inverter device of the electric motor mounted at the rear of the vehicle.

Figure 1:
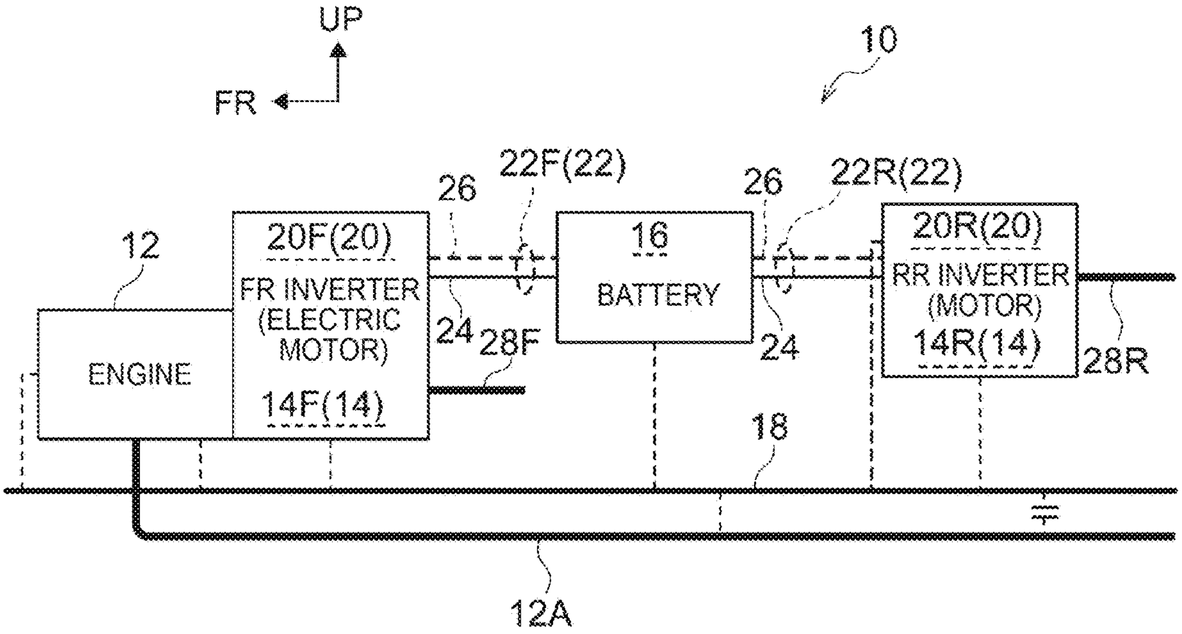
FIG. 1 is a schematic configuration diagram showing the main parts of a vehicle according to the present embodiment.

FIG. 1 shows a schematic configuration diagram of the main parts of a vehicle 10 according to the present embodiment. In the drawings, the front side of the vehicle is indicated by an arrow FR, the left side in the vehicle width direction is indicated by an arrow HL, and the upper direction is indicated by an arrow UP.

As shown in FIG. 1, the vehicle 10 is equipped with an engine 12, an electric motor (electric motor) 14 as a drive source for driving, and a battery 16 as a storage battery, and the vehicle 10 is a so-called hybrid electric vehicle (HEV). The vehicle 10 includes an engine 12 on the front side of the vehicle, and an exhaust pipe 12A is disposed therein. One end of the exhaust pipe 12A is connected to the engine 12, and another end side extends on a lower side of the body 18 as the vehicle body toward the rear of the vehicle and opens toward the rear of the vehicle. Note that the vehicle 10 may be a plug-in hybrid electric vehicle (PHEV) or a battery electric vehicle (BEV), and the vehicle 10 may be a fuel cell electric vehicle (FCEV).

The vehicle 10 includes a motor 14F on the front side of the vehicle and a motor 14R on the rear side of the vehicle as the motors 14. In the vehicle 10, a motor 14F is mounted together with the engine 12 on the front side of the body 18, a motor 14R is mounted on the rear side of the body 18, and a battery 16 as a storage battery is mounted on the center part of the body 18 in the longitudinal direction of the vehicle.

The battery 16 stores high-voltage DC power (60 V or more in terms of DC voltage in a vehicle, for example, 200 V to 300 V). Furthermore, the motors 14 (14F, 14R) are AC motors driven by AC power (for example, three-phase AC power). Therefore, each of the motors 14 (14F, 14R) is integrated with an inverter device 20 (20F, 20R) for converting DC power into AC power. The inverter device 20 (20F, 20R) functions as a power-supplied device in this embodiment.

The inverter device 20 (20F, 20R) is connected to the battery 16 by a wire harness 22 (22F, 22R) as a cable. In vehicle 10, battery 16 and inverter device 20F are electrically connected by wire harness 22F, and battery 16 and inverter device 20R are electrically connected by wire harness 22R.

The wire harness 22 (22F, 22R) has a substantially circular cross section (or may be substantially elliptical), and the wire harness 22 has two electric wires 24 arranged as core wires at the axial center (radially inner portion), a shield 26 is arranged on the outer periphery. The electric wire 24 has a conducting wire covered with an insulating resin. Further, the shield 26 is formed into a substantially cylindrical (tubular) shape having flexibility. In the wire harness 22 (22F, 22R), a shield 26 is covered with an insulating resin forming the outer periphery, an insulating resin is interposed between the shield 26 and two electric wires 24 inside the shield 26, and the wire The harness 22 is a two-core shielded cable.

The shield 26 of the wire harness 22 can be formed into a tube shape by braiding a required number of conducting wires. Further, the shield 26 may have various known configurations, such as one formed into a tube shape by spirally winding a band-shaped conductive metal foil such as copper foil. In the wire harness 22, the shield 26 covers the entire outer circumference and length of the electric wires 24 at the axial center, so that the electric wires 24 can be magnetically shielded from the outside of the wire harness 22.

In each of the wire harnesses 22F and 22R, one of the two electric wires 24 is used as a P wire, and the other is used as an N wire. In the wire harness 22F, the electric wire 24 serving as a P wire electrically connects the positive electrode of the battery 16 and a positive electrode of the inverter device 20F, and the electric wire 24 serving as an N wire electrically connects the negative electrode of the battery 16. It is electrically connected to the negative electrode of the inverter device 20F. In addition, in the wire harness 22R, the electric wire 24 serving as a P line electrically connects the positive electrode (positive electrode) of the battery 16 and a positive electrode of the inverter device 20R, and the electric wire 24 serving as an N line electrically connects the negative electrode (negative electrode) of the battery 16 and the negative electrode of the inverter device 20R are electrically connected.

In the vehicle 10 configured in this manner, the electric power of the battery 16 is supplied (power fed) to the inverter device 20F through the wire harness 22F, and is supplied (power fed) to the inverter device 20R through the wire harness 22R. As a result, in the vehicle 10, the inverter devices 20F and 20R each convert the DC power of the battery 16 into AC power and supply the AC power to the motors 14F and 14R. In the vehicle 10, the front shaft 28F and the rear shaft 28R are rotationally driven by power being supplied to the motors 14F and 14R, and the vehicle 10 runs.

In this vehicle 10, the metal casings in which the engine 12, motors 14F, 14R, battery 16, and inverter devices 20F, 20R are housed are grounded to the body 18 (see broken lines in FIG. 1). As a result, in the vehicle 10, the casing housing the engine 12, motors 14F, 14R, battery 16, and inverter devices 20F, 20R, and the body 18 are at the same potential.

Further, in the vehicle 10, the shield 26 of the wire harness 22F is grounded to the body 18 on each of the battery 16 side and the inverter device 20F side. Furthermore, in the vehicle 10, the shield 26 of the wire harness 22R is grounded to the body 18 on each of the battery 16 side and the inverter device 20R side.

On the other hand, in the wire harness 22 (22F, 22R), common mode current (primary common mode current) flows through the two electric wires 24 because they are connected to the inverter device 20 (20F, 20R), and the primary common mode current A current corresponding to the current flows through the shield 26. In the vehicle 10, both ends of the shield 26 in the wire harness 22 are grounded to the body 18, thereby forming a loop-shaped path through which current flows between the body 18 and the shield 26. For this reason, in the vehicle 10, a secondary common mode current corresponding to the primary common mode current flows through this loop-shaped path. As a result, electromagnetic noise (radiated noise) that becomes EMI (electromagnetic interference) is emitted from the vehicle 10.

Here, if the primary common mode current is $I_1$, the secondary common mode voltage generated in the shield 26 by the primary common mode current is $V_2$, and the transfer impedance of the wire harness 22 is Zt, then the transfer impedance Zt of the wire harness 22 is as follows: It is expressed by equation (1).

$$Zt=V_2/I_1 \quad (1)$$

Also, let Z be the transfer impedance between the body 18 and the shield 26 for the secondary common mode current $I_2$. At this time, if the value of the secondary common mode current $I_2$ is approximately 1 (A), the value of the transfer impedance Z and the value of the secondary common mode voltage $V_2$ are values that can be considered to be approximately the same. As a result, the secondary common mode current $I_2$ that causes conduction noise is expressed by the following equation (2).

$$I_2=V_2/Z \quad (2)$$

Therefore, conduction noise becomes stronger as the secondary common mode current $I_2$ becomes larger, and becomes weaker as the secondary common mode current $I_2$ becomes smaller. As a result, the secondary common mode current $I_2$ can be suppressed by reducing the transfer impedance Z or the secondary common mode voltage $V_2$, thereby suppressing the conduction noise radiated from the vehicle 10. Radiated noise can be suppressed.

From this point on, in this embodiment, a voltage suppression structure (voltage suppression section) for suppressing the secondary common mode voltage $V_2$ and suppressing the secondary common mode current $I_2$ is provided between the inverter device 20 and the wire harness 22.

In the vehicle 10, the basic configurations of the inverter device 20F and the inverter device 20R, and the basic configurations of the wire harness 22F and the wire harness 22R are the same. Below, in each of the first and second embodiments, the voltage suppressing unit applied to the cable mounting structure will be explained using the inverter device 20R and wire harness 22R on the motor 14R side mounted on the rear side of the vehicle as examples.

First Embodiment

Figure 2:
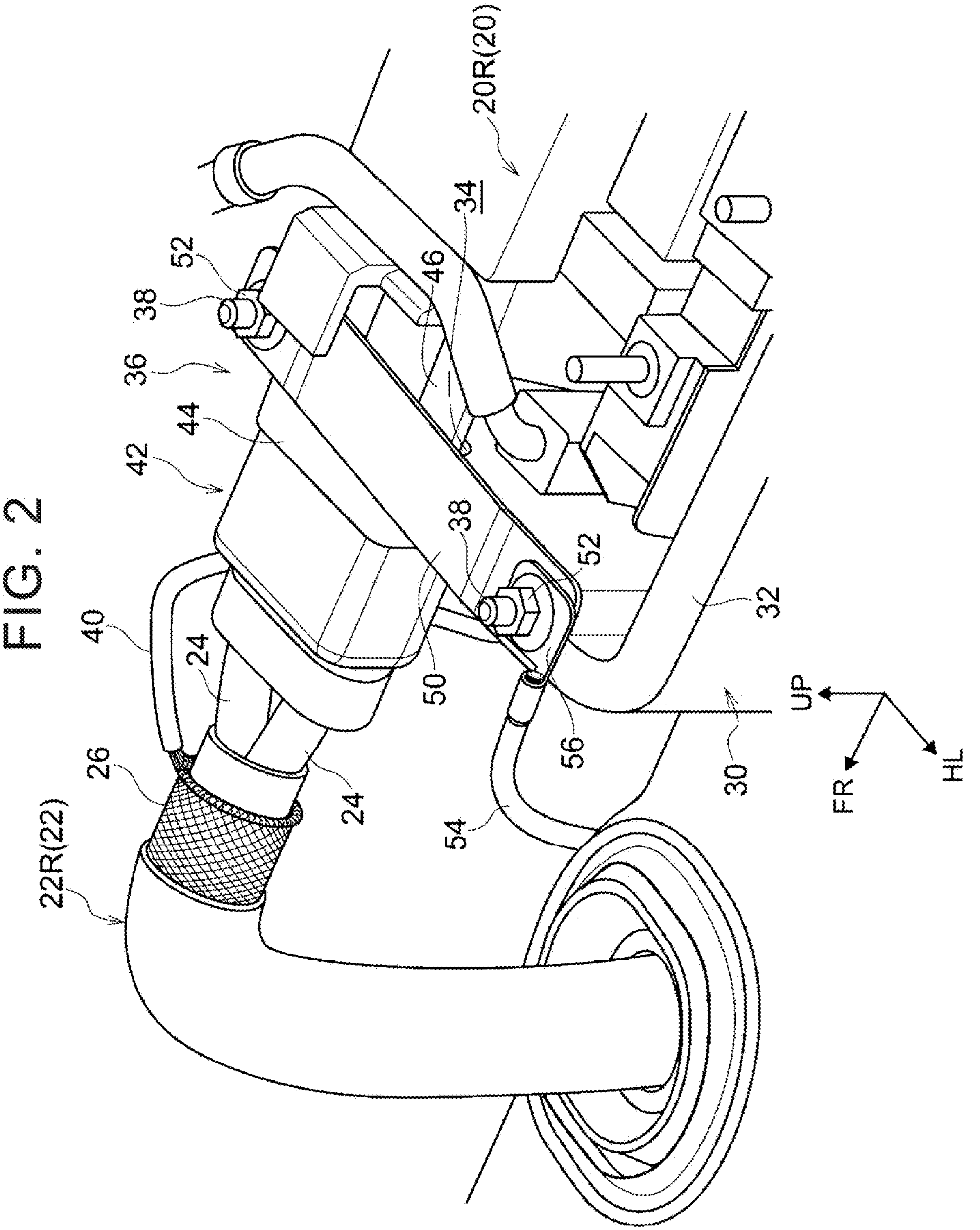
FIG. 2 is a perspective view of the main parts of the inverter device showing the connection of the wire harness to the inverter device according to the first embodiment.

FIG. 2 shows a perspective view of the main parts of the inverter device 20R according to the first embodiment as viewed obliquely upward and diagonally backward to the left.

In the vehicle 10, the inverter device 20R is housed in a metal (for example, aluminum) casing 30 serving as a housing. The main part of the casing 30 has a substantially rectangular box shape, and the casing 30 includes a casing body 32 as a casing main body opened upward, and a lid for closing the opening surface of the casing body 32. It is equipped with a body (not shown). Note that a known general configuration can be applied to the inverter device 20R, and illustrations and descriptions of circuit boards and the like that constitute the inverter device 20R arranged inside the casing body 32 are omitted below.

A connection port 34 for connecting the wire harness 22R is formed on the vehicle front side of the casing body 32, and the connection port 34 is penetrated in the front-rear direction and opened upward. In the first embodiment, a voltage suppressing portion 36 is formed in the connection port 34.

Stud bolts 38 as mounting bolts are arranged on the upper surface of the casing body 32, and the stud bolts 38 are arranged in pairs with the connection port 34 in between. In the casing 30, the stud bolt 38 is used to fasten and fix the lid to the casing body 32.

On the other hand, when attaching the wire harness 22R to the inverter device 20R, necessary terminal processing is performed. In the terminal treatment of the wire harness 22R, for example, the resin on the outer periphery is peeled off and the shield 26 pulled out is twisted to form a wire of a required length (a conductive wire or electric wire of a required length may be connected), and the wire is A terminal (for example, a flag terminal or a round terminal) (not shown) is crimped and connected to the tip of the shape (soldering or the like may be used). Further, the shield 26 pulled out from the wire harness 22R has an intermediate portion covered with an insulating tube 40 such as a heat shrink tube, and a distal end portion connected to the casing body 32 etc. and connected to the body 18 (grounded).

Further, a connector 42 is used to connect the wire harness 22R to the inverter device 20R. The connector 42 is formed by resin molding, and the outer peripheral surface of the connector 42 is covered with a housing 44 made of conductive metal.

In the wire harness 22R, each of the electric wires 24 is connected to a predetermined position in the connector 42, the connector 42 is inserted into the connection port 34 of the casing body 32, and the wire harness 22R is attached to the socket 46 in the casing body 32. Thereby, the electric wires 24 of the wire harness 22R are electrically connected to the circuit board of the inverter device 20R.

A bracket 50 is used for the voltage suppressing portion 36. The bracket 50 is formed of a conductive metal into a strip shape with a required thickness and length, and through holes (not shown) into which the stud bolts 38 are inserted are formed at both longitudinal ends of the bracket 50. The bracket 50 is disposed on the casing body 32 by inserting the stud bolts 38 into the respective through holes at both ends, and is fastened and fixed to the casing body 32 by fastening nuts 52 that are screwed into each of the stud bolts 38. By being fastened and fixed to the casing body 32, the bracket 50 is brought into surface contact with the upper surface of the casing body 32 and the housing 44 of the connector 42, and is brought into a conductive state. Thereby, the wire harness 22R is held on the casing body 32 by the bracket 50.

Further, the voltage suppressing portion 36 uses a grounding wire (grounding wire) 54 which is a conductive wire coated with resin. The grounding wire 54 has a terminal (for example, a flag terminal 56) crimped and connected to one end with the required length. The grounding wire 54 is fastened and fixed by a fastening nut 52 with the flag terminal 56 being stacked on the bracket 50 and the stud bolt 38 being inserted. Further, the grounding wire 54 is electrically connected to the body 18 at its end opposite to the flag terminal 56. As a result, in the voltage suppressing portion 36, the housing 44 of the connector 42, the casing body 32, and the peripheral edges of the connection port 34 of the lid body are earthed (grounded) via the bracket 50 and the grounding wire 54.

In the voltage suppressing portion 36 of the first embodiment configured in this manner, the housing 44 of the connector 42 to which the wire harness 22R is attached is grounded via the bracket 50 and the grounding wire 54. Further, in the voltage suppressing portion 36, the periphery of the connection port 34 of the casing body 32 is grounded via a bracket 50 and a grounding wire 54. Thereby, the voltage suppressing portion 36 can suppress the secondary common mode voltage $V_2$ and suppress the appearance of conduction impedance, so that emission of radiation noise (electromagnetic noise) can be suppressed.

Second Embodiment

Figure 3:
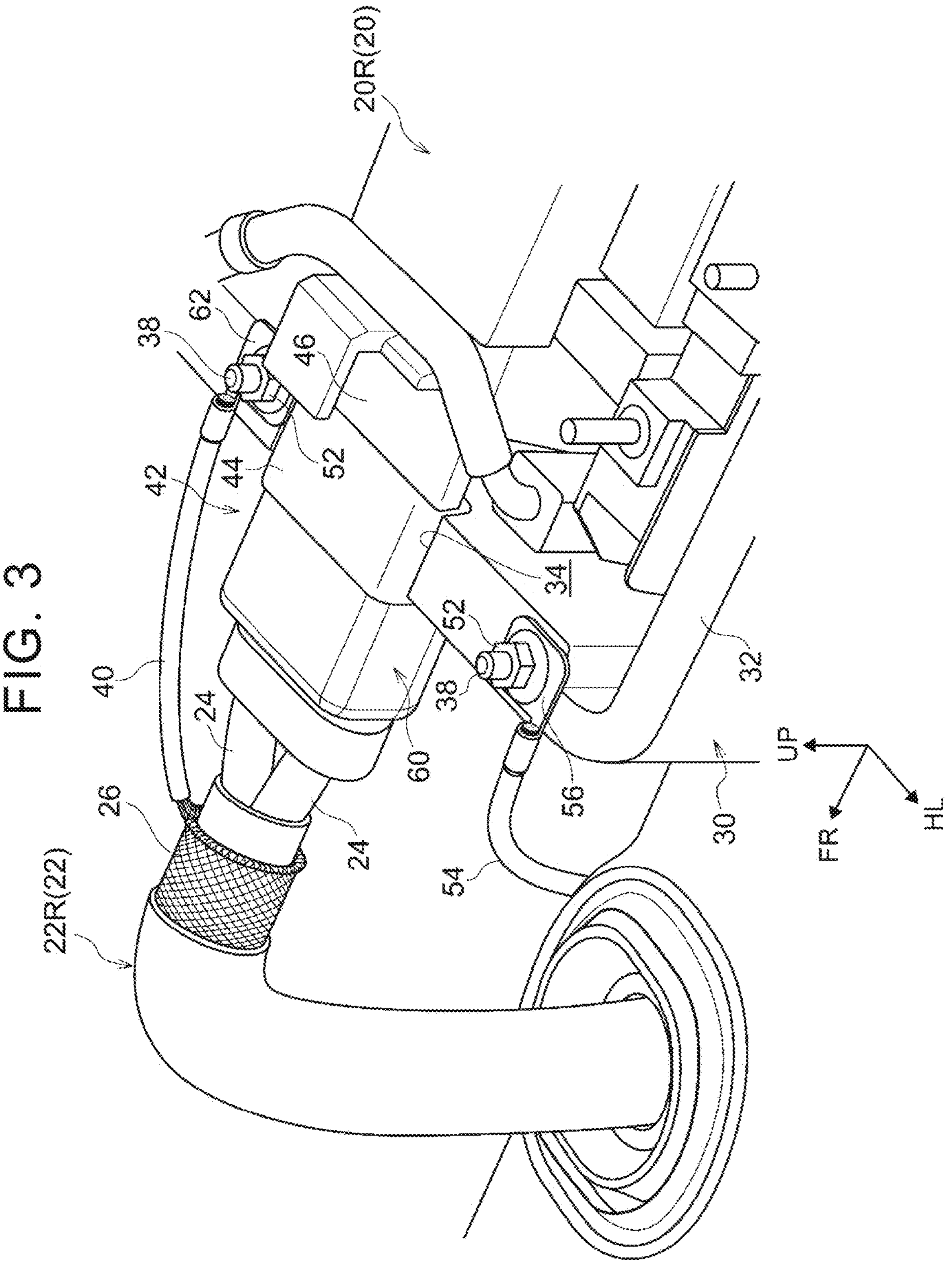
FIG. 3 is a perspective view of the main parts of the inverter device showing the connection of the wire harness to the inverter device according to the second embodiment.

FIG. 3 shows a perspective view of the main parts of an inverter device 20R according to the second embodiment as viewed obliquely upward and diagonally backward to the left. The basic configuration of the second embodiment is the same as that of the first embodiment, and the same components as in the first embodiment in the second embodiment are given the same reference numerals as in the first embodiment, and their explanations are omitted.

In the second embodiment, a voltage suppressing portion 60 is used in place of the voltage suppressing portion 36 of the first embodiment, and the voltage suppressing portion 60 is formed around the connection port 34 of the casing body 32. In the voltage suppressing portion 60, a terminal (for example, a flag terminal 62) is crimped and connected to the tip of the shield 26 drawn out from the wire harness 22R.

In the voltage suppressing portion 60, without using the bracket 50, one of the stud bolts 38 installed upright at the peripheral edge of the connection port 34 is inserted into the round hole of the flag terminal 62 of the shield 26, and the casing is tightened with the fastening nut 52. It is fastened and fixed in a state where it is in surface contact with the upper surface of the body 32. Further, in the voltage suppressing portion 60, a flag terminal 56 of a grounding wire 54 is fastened and fixed to the other side of the stud bolt 38, and the other side of the grounding wire 54 opposite to the flag terminal 56 is connected to the body 18.

In the voltage suppressing portion 60 of the second embodiment configured as described above, the shield 26 of the wire harness 22R is fastened and fixed to one of the stud bolts 38 of the casing body 32, so that the area around the connection port 34 of the casing 30 is electrically connected to. Further, in the voltage suppressing portion 60, the grounding wire 54 is fastened and fixed to the other stud bolt 38, so that the peripheral edge of the connection port 34 of the shield 26 and the casing 30 is grounded.

As a result, the voltage suppressing portion 60 can suppress the generation of a potential difference between the peripheral part of the connection port 34 of the casing body 32 and the shield 26 of the wire harness 22R and the body 18, so that the secondary common mode voltage $V_2$ can be suppressed. Therefore, the voltage suppressing portion 60 can suppress the appearance of the transfer impedance Z that causes conduction noise, and can suppress the radiation noise radiated from the vehicle 10. In the second embodiment, the connector 42 is attached to the wire harness 22R, but the wire harness 22F is connected to the inverter device 20R by inserting the electric wires 24 from the connection port 34 without attaching the connector 42.

Figure 4:
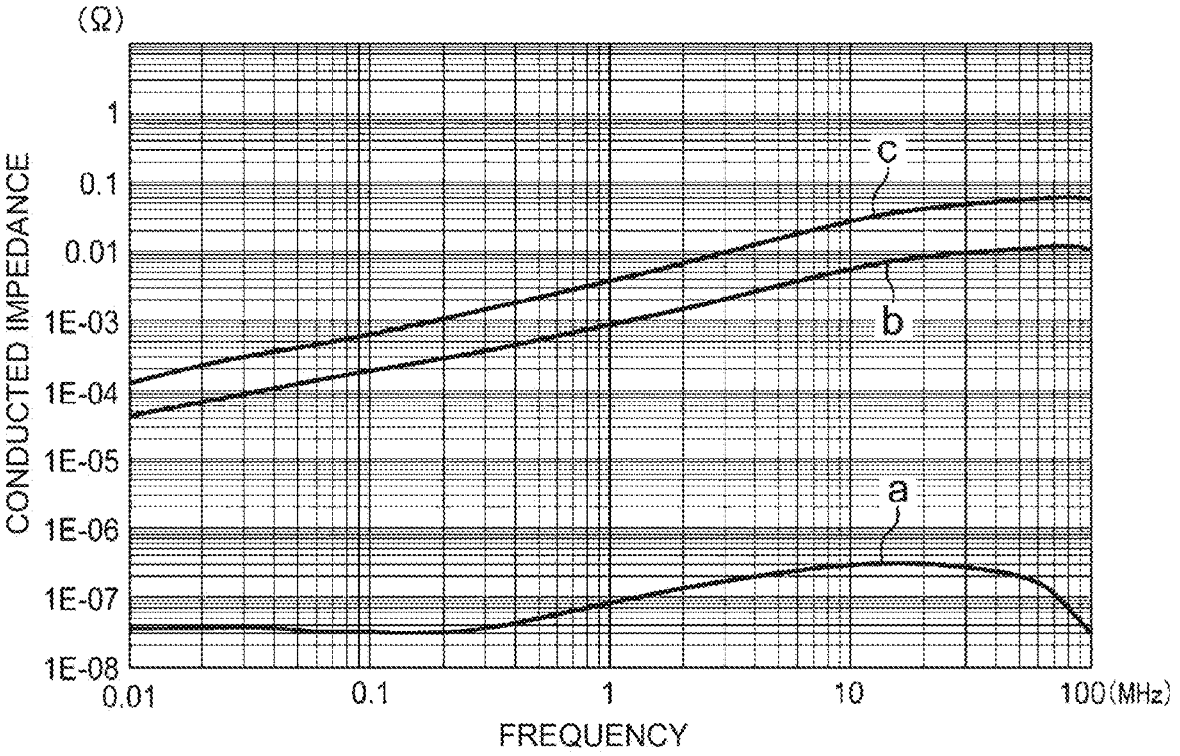
FIG. 4 is a diagram schematically showing transfer impedance versus frequency.

Here, FIG. 4 shows a schematic diagram of the transfer impedance (Zt) with respect to frequency simulated using a triaxial analysis model for a general wire harness. Note that in FIG. 4, the horizontal axis represents frequency (MHz), and the vertical axis represents transfer impedance (Ω).

In FIG. 4, graph a shows a wire harness using 12 braided wires for the shield. Graphs b and c show wire harnesses in which a connector (corresponding to connector 42) covered by a metal housing is attached to the wire, and graph b shows a wire harness in which a braided wire with a number of 6 is used for the shield. Graph c shows a wire harness using three braided wires in the shield. Note that the wire harnesses in graphs a to c differ only in the number of braided wires, but the wire diameter (0.18 mm), number of strokes (44 wires), and braid angle (15°) of the braided wires are the same.

Generally, in a wire harness, the higher the transfer impedance, the more the radiated noise increases. As shown in graphs b and c of FIG. 4, in a wire harness, the transmission impedance is lower (becomes smaller) when the number of braided wires is larger than when the number of braided wires is smaller. Further, as can be seen from the comparison between graph a and graphs b and c, the transmission impedance of the wire harness increases (increases) by being attached to the connector.

Figure 5:
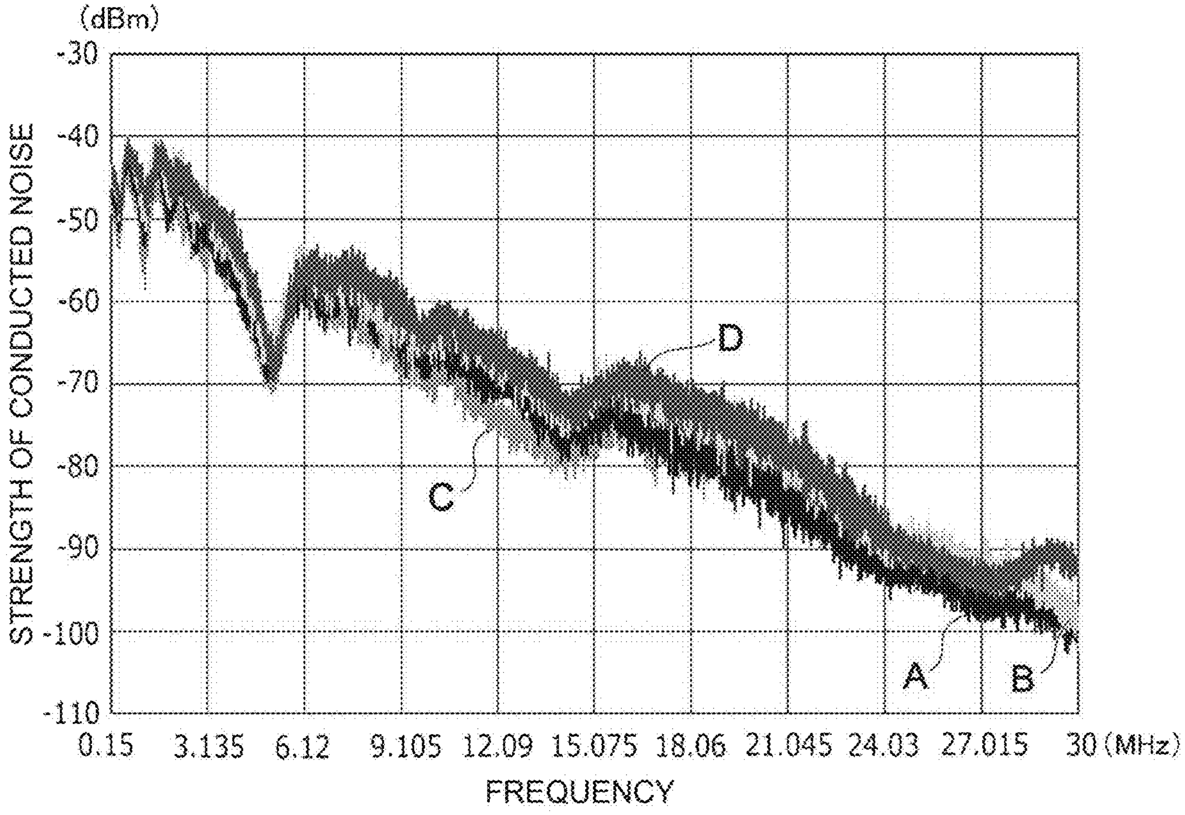
FIG. 5 is a diagram schematically showing changes in the level of conduction noise emitted from the wire harness with respect to frequency.
Figure 6:
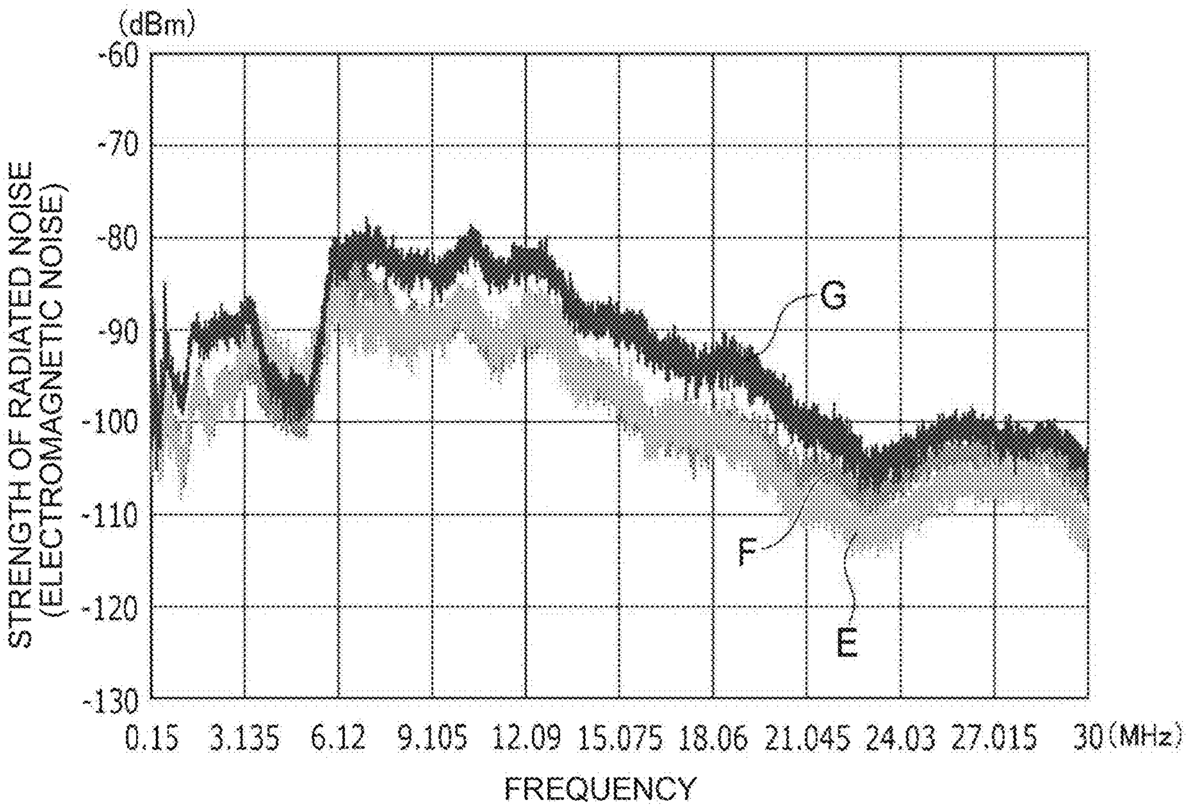
FIG. 6 is a diagram schematically showing changes in the level of radiation noise radiated outside the vehicle with respect to frequency.

On the other hand, FIG. 5 shows an outline of the measurement results of the level of conducted noise with respect to frequency, and FIG. 6 shows an outline of the measurement results of the level of radiated noise emitted as electromagnetic noise around the vehicle body. It is shown in the diagram. In addition, FIG. 5 shows the measurement results obtained by collectively measuring the shield of the wire harness and the electric wire. In FIG. 5, the horizontal axis is the frequency (MHz), and the vertical axis is the intensity of the transmitted noise (level) (dBm). In addition, in FIG. 6, a measurement antenna was installed at a position 3 m away from the vehicle body at the rear of the vehicle, and the measurement results of the radiation noise radiated from the vehicle body are shown. In FIG. 6, the horizontal axis represents the frequency (MHz), and the vertical axis is the intensity (level) (dBm) of the radiated noise.

Graph A in FIG. 5 uses a configuration corresponding to the voltage suppressing portion 36 of the first embodiment in order to suppress radiation noise, and graph B in FIG. 5 and graph E in FIG. 6. uses a configuration corresponding to the voltage suppressing portion 60 of the second embodiment. Further, graph C in FIG. 5 and graph F in FIG. 6 have a configuration in which a ferrite core is used to suppress radiation noise (comparative example 1). Graph D in FIG. 5 and graph G in FIG. 6 have a configuration in which no measures are taken to suppress radiation noise (comparative example 2).

As shown in FIG. 5, in the first example, the second example, and the comparative example 1, the conducted noise level is suppressed as compared to the comparative example 2 at each frequency due to the measures taken to suppress conducted noise (radiated noise). Further, the first example and the second example have conduction noise intensity (level) that is equal to or lower than that of comparative example 1 using a ferrite core.

Furthermore, in the vehicle 10 equipped with the engine 12, the radiated noise emitted from the vehicle body is stronger on the rear side of the vehicle than on the front side of the vehicle, and the intensity of the radiated noise emitted from the front side of the vehicle is set in advance. Even if the target value is met, the radiation noise radiated from the rear side of the vehicle exceeds the target value, and the radiation noise radiated as a whole exceeds the target value. From here, FIG. 6 shows the measurement results of radiation noise at the rear of the vehicle.

As shown in FIG. 6, in the second example and comparative example 1, the intensity of radiated noise is lower (weaker) than in comparative example 2, in which no radiation noise suppression measures are taken at each frequency. In the second embodiment and comparative example 1, radiation noise emitted from the vehicle body can be suppressed by taking measures to suppress radiation noise. Further, in the second example in which a ferrite core is not used as a countermeasure against radiation noise, the intensity of radiation noise is equal to or lower than that in comparative example 1 in which a ferrite core is used. Therefore, in the first embodiment and the second embodiment, without using a ferrite core, it is possible to obtain a radiation noise suppression effect equivalent to or greater than that obtained by using a ferrite core.

In this way, the voltage suppressing portions 36 and 60 are provided to suppress the common mode voltage that causes a common mode current between the wire harness 22R and the inverter device 20R. Thereby, radiation noise caused by conduction noise can be suppressed without using a ferrite core that suppresses conduction noise by increasing conduction impedance.

Furthermore, when using a ferrite core, it is necessary to manufacture an assembly in which the ferrite core is attached to the wire harness 22 in advance, and to assemble the assembly when assembling the vehicle. On the other hand, by not using a ferrite core, when manufacturing the vehicle 10, it is possible to suppress an increase in the cost for the ferrite core, the number of assembly steps, and the number of work steps, and the manufacturing cost of the vehicle 10 can be suppressed.

Generally, in a vehicle 10 equipped with motors 14F and 14R, the radiation noise at the rear of the vehicle is stronger than at the front of the vehicle. By applying voltage suppressing portion 36, 60 in attaching the wire harness 22R to the inverter device 20R, the radiation noise of the vehicle 10 can be effectively suppressed.

Note that in the first embodiment, the voltage suppressing portion 36 was formed, and in the second embodiment, the voltage suppressing section was formed, but when attaching the wire harness 22 to the inverter device 20, a configuration in which the voltage suppressing portions 36 and 60 are combined may be applied.

Moreover, in this embodiment described above, the inverter device 20R was provided in the motor 14R, and the wire harness 22R was connected via the voltage suppressing portions 36 and 60. However, the voltage suppressor may be used to attach a cable to an inverter device of a motor on the front side of the vehicle.

What is claimed is:

1. A cable attachment structure comprising:

a cable that includes a shield on an outer peripheral portion of the cable and a wire inside the cable, the shield shielding the wire;

a metal casing that houses a powered device that generates a common mode current in the cable, the powered device being connected to a storage battery by the cable and supplied with power by the wire, the metal casing including a connection port through which the cable passes;

a first attachment bolt provided at a first edge portion of the connection port of the metal casing;

a second attachment bolt provided at a second edge portion of the connection port of the metal casing;

a connector being connected to the cable and the connection port; and a voltage suppressing portion configured to suppress a common mode voltage that causes the common mode current, the voltage suppressing portion being disposed at a periphery of the connection port of the metal casing, wherein:

the voltage suppressing portion includes a conductive member that is provided between the cable and the metal casing, and the conductive member is fixed to the metal casing by at least one of the first attachment bolt and the second attachment bolt and is electrically connected to both the connector and the metal casing or both the shield of the cable and the metal casing.

2. The cable attachment structure according to claim 1, wherein the powered device is an inverter device that supplies power to an electric motor used as a driving source for traveling of a vehicle.

3. The cable attachment structure according to claim 2, wherein the voltage suppressing portion is used to connect the cable to the inverter device of the electric motor mounted at a rear portion of the vehicle.

4. The cable attachment structure according to claim 2, wherein:

the conductive member is a band-shaped bracket that is provided to the connection port, the bracket including a surface that is contacted with both an outer peripheral surface of the connector and the metal casing such that the connector and the metal casing are electrically connected, and the bracket being spanned over the first and second attachment bolts and fixed by the first and second attachment bolts; and the voltage suppressing portion further includes a grounding wire including a first terminal and a second terminal, the first terminal being fixed together with the bracket by the first attachment bolt, and the second terminal being connected to a body of the vehicle.

5. The cable attachment structure according to claim 4, wherein the outer peripheral surface of the connector is covered with a housing made of conductive metal.

6. The cable attachment structure according to claim 2, wherein:

the conductive member is a connection terminal of the shield that is extending from the cable and fixed to the metal casing by the second attachment bolt such that the shield and the metal casing are electrically connected; and the voltage suppressing portion further includes a grounding wire including a first terminal and a second terminal, the first terminal being fixed to the metal casing by the first attachment bolt, and the second terminal being connected to a body of the vehicle.

* * * * *